(12) United States Patent
Schroeder

(10) Patent No.: US 10,703,277 B1
(45) Date of Patent: Jul. 7, 2020

(54) HEADS-UP DISPLAY FOR AN AGRICULTURAL COMBINE

(71) Applicant: CNH Industrial America LLC, New Holland, PA (US)

(72) Inventor: Jay David Schroeder, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/414,183

(22) Filed: May 16, 2019

(51) Int. Cl.
| | | |
|---|---|---|
| *B60R 1/00* | (2006.01) | |
| *A01D 57/22* | (2006.01) | |
| *A01D 45/02* | (2006.01) | |

(52) U.S. Cl.
CPC ............ *B60R 1/002* (2013.01); *A01D 45/021* (2013.01); *A01D 57/22* (2013.01); *B60R 2300/205* (2013.01); *B60R 2300/207* (2013.01); *B60R 2300/302* (2013.01)

(58) Field of Classification Search
None
See application file for complete search history.

(56) References Cited

U.S. PATENT DOCUMENTS

| | | | | |
|---|---|---|---|---|
| 5,610,764 A | * | 3/1997 | Faivre ................... | G02B 27/01 345/7 |
| 7,756,624 B2 | | 7/2010 | Diekhans et al. | |
| 8,406,990 B2 | | 3/2013 | Barkowski et al. | |
| 9,164,281 B2 | * | 10/2015 | Hing ...................... | G02B 27/01 |
| 10,573,271 B1 | * | 2/2020 | Lvovskiy ................. | A42B 3/22 |
| 2013/0305437 A1 | * | 11/2013 | Weller ................. | A42B 3/0406 2/422 |
| 2014/0237975 A1 | | 8/2014 | Walker | |
| 2015/0101303 A1 | | 4/2015 | Priepke | |
| 2015/0223032 A1 | * | 8/2015 | Nespolo ............... | G01C 21/362 701/2 |
| 2016/0257095 A1 | * | 9/2016 | Cleary ................... | G02B 27/01 |
| 2017/0299862 A1 | * | 10/2017 | Yamaguchi ............ | B60K 35/00 |
| 2019/0045709 A1 | | 2/2019 | Schroeder et al. | |
| 2019/0049726 A1 | * | 2/2019 | Nomura ............ | G02B 27/0101 |
| 2019/0061747 A1 | * | 2/2019 | Wieczorek ............ | B60W 30/09 |
| 2019/0210526 A1 | * | 7/2019 | Takiguchi .............. | B60K 35/00 |
| 2019/0235243 A1 | * | 8/2019 | Anzai .................... | G02B 27/01 |
| 2020/0053962 A1 | * | 2/2020 | Dix .................... | A01D 41/1278 |

FOREIGN PATENT DOCUMENTS

| | | |
|---|---|---|
| DE | 202005002485 U1 | 6/2006 |
| EP | 1674324 B2 | 5/2014 |
| FR | 3033053 B1 | 4/2018 |

* cited by examiner

*Primary Examiner* — Fekadeselassie Girma
(74) *Attorney, Agent, or Firm* — Peter Zacharias; Patrick Sheldrake

(57) ABSTRACT

An agricultural vehicle having a chassis supported for movement on the ground by wheels, a header operatively connected to a front end of the chassis, an operator accommodation located on the chassis and having an associated viewing region, and a heads-up display system located on the chassis on a visual path between a reference point on the combine and the viewing region. The heads-up display system is configured to project an image visible from a predetermined location within the viewing region, the image comprising a dynamic guideline extending from the reference point on the header towards a crop entry point.

20 Claims, 4 Drawing Sheets

HEADS-UP DISPLAY FOR AN AGRICULTURAL COMBINE

BACKGROUND OF THE INVENTION

Agricultural crops are typically planted in discrete rows. As such, planting, cultivating and harvesting equipment sometimes include operative features that are arranged in row units that are spaced to correspond with the rows of the particular crop, and the machines are operated to align the row units with the crop rows. For example, agricultural combines used for harvesting corn and similar crops typically have a header with discrete row units, with each row unit comprising, for example: gathering chains to pull the stalks towards the header, snapping rolls to pull the stalks downwards below the header to cause the ears to snap off the stalks, and deck plates or rails to direct the ears of corn. In a corn header, each row unit typically is separated from the adjacent row unit or units by a divider in the shape of a cone or the like. Other agricultural machines might use other types of row unit, such as rows of sprayers, cutters, or the like.

A common problem with agricultural machines having row units is that it can be difficult, time consuming, or fatiguing to properly align the row units with the correct row when entering the crop field. This issue arises when the machine is first introduced to the crop field, and to a greater degree when turning the machine from processing one group of crop rows to the adjacent group of crop rows. The typical process to align the machine properly with the rows is to count off a number of standing rows or gaps between rows corresponding to a reference point on the header, then guide the reference point to the position identified in the count. For example, when turning a combine having a corn header with twelve row units, the operator might count the standing rows to identify the gap between the sixth and seventh rows, then drive the combine to put the crop divider between the sixth and seventh crop units into the gap between the sixth and seventh crop rows. This process is useful when the header is too wide to consistently and accurately judge when the edge of the header is lined up with the first row of standing crop, and has the benefits of being simple and usually being effective. However, this process is prone to error, particularly when the operator is fatigued, when light conditions are reduced, when operating at a relatively high ground speed and as corn headers become wider with more row units.

Thus, the inventors have determined that the state of the art still requires further advancement.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural vehicle having a chassis supported for movement on the ground by wheels, a header operatively connected to a front end of the chassis, an operator accommodation located on the chassis and having an associated viewing region, and a heads-up display system located on the chassis on a visual path between a reference point on the combine and the viewing region. The heads-up display system is configured to project an image visible from a predetermined location within the viewing region, the image comprising a dynamic guideline extending from the reference point on the header towards a crop entry point.

In some aspects, the header may have a plurality of row units, and the reference point may be a point associated with one or more of the row units. The header may have a divider between two adjacent ones of the plurality of row units, and the reference point may be a point on the divider. The reference point may be a virtual point located in a space adjacent the one or more of the row units.

In some aspects, the reference point may include a point on a lateral centerline of the header.

In some aspects, the heads-up display may be adjustable to move the predetermined point within the viewing region.

In some aspects, the dynamic guideline may include a straight line extending from the reference point towards the crop entry point.

In some aspects, the dynamic guideline may include a curved line extending from the reference point towards the crop entry point. The curved line may include a projection of a curved travel path from the reference point to the crop entry point.

In some aspects, the image further may include a dynamic representation of an instantaneous travel path of the agricultural vehicle.

In some aspects, the dynamic guideline may include a dashed line.

In some aspects, the dynamic guideline may include an animated line.

In some aspects, the heads-up display system may be configured to: determine a physical location of the reference point; determine a physical location of the crop entry point; and determine a displacement between the physical location of the reference point and the physical location of the crop entry point. The heads-up display system also may be configured to determine the physical location of the reference point by: obtaining a position of a localization sensor from a location sensor; and applying a predetermined offset to the position of the localization sensor to calculate the physical location of the reference point. The localization sensor may include a global positioning system sensor. The heads-up display system may be configured to determine the physical location of the crop entry point by correlating an identity of the crop entry point with predetermined map coordinates for the crop entry point. The heads-up display system may be configured to determine the physical location of the crop entry point based on vehicle position information. The heads-up display system may be configured to determine a physical location of the crop entry point based on a physical position of the reference point at a time when the reference point exits a processed row of crops.

In some aspects, the heads-up display may include a projector and a combiner, and the combiner may be integral with the windscreen.

In some aspects, the agricultural vehicle may be a combine having a threshing and separating system, and the header may be connected to the threshing and separating system by a feeder housing.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide a heads-up display ("HUD") for agricultural equipment. Embodiments are expected to be particularly useful on agricultural equipment configured with row units that operate on separate crop rows, but uses may be made in other equipment as well.

Figure 1:
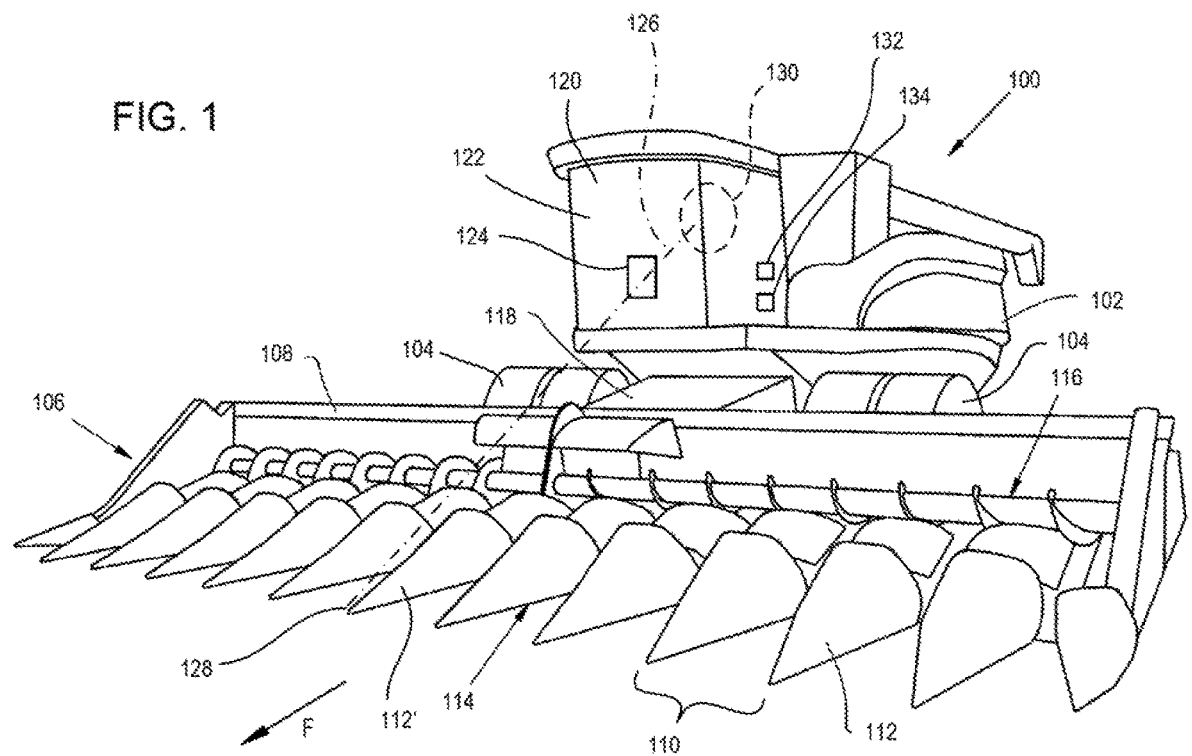
FIG. 1 illustrates an example of an agricultural combine and associated equipment.

Referring to FIG. 1, an example of an agricultural vehicle in the form of a combine 100 is illustrated. The combine 100 includes a chassis 102 that is supported for movement on the ground by wheels 104. The wheels 104 may be provided in any number as necessary to support the combine 100 for movement along the ground, and may comprise any combination of pneumatic tires, tracked wheel assemblies, or the like. One or more engines (not shown) are provided to power the wheels 104 to drive the combine 100 in a forward drive direction F. One or more wheels are steerable to cause the combine 100 to change directions, or such steering may be accomplished through applying differential drive forces to different wheels.

A header 106 is attached to the forward end of the combine 100. The header 106 is configured to receive crop material and convey such material via to a threshing and separating system (not shown) located in or on the chassis 102. The header 106 comprises a frame 108 that extends parallel to the ground in a lateral direction that is perpendicular to the straight-ahead forward direction F. The frame 108 supports one or more operating units that interact with the crops. For example, the frame 108 may support left-side and right-side drapers that each have an elongated cutter to cut crops and a conveyor to move the cut crops to the center of the header 106.

In a more preferred embodiment, the header 106 comprises a plurality of row units 110. Each row unit 110 is a separate mechanism configured to process one or more crop rows (typically a single row). Each row unit 110 may include, for example, gathering chains, snapping rolls, deck plates or rails, a crop stomper, and other features known in the art. The row units 110 may be separated by dividers 112, such as tapered, wedge-shaped, or conical housings that extend in the forward direction F. The dividers 112 form funnel like openings 114 to direct crops into each the row unit 110. Various examples of row units 110 are described in U.S. application Ser. No. 15/671,782 (U.S. Pub. No. 2019/0045709), U.S. application Ser. No. 14/053,671 (U.S. Pub. No. 2015/0101303), and U.S. application Ser. No. 13/780,694 (U.S. Pub. No. 2014/0237975), all of which are incorporated herein by reference. The shown embodiment and foregoing examples are row units typically used for harvesting corn, but other devices may be used, and the invention is not strictly limited to operations on corn or harvesting operations.

The header 106 has one or more augers 116, conveyor belts, or the like, that convey the gathered crop material to the lateral center of the header 106. The gathered crop material is directed to a feeder housing 118, which connects the header 106 to the chassis 102. The feeder housing 118 has a conveyor that transports the crop material to a threshing and separating system that separates grain from the remaining crop material. Separated grain is stored in a grain hopper or the like for later recovery The operation and construction of the foregoing components of the combine 100 are well-known in the art and need not be described in greater detail herein.

The header 106 in FIG. 1 is a twelve-row header, meaning it has twelve row units 110. The row units 110 are distributed evenly along the header 106 in the lateral direction. A center divider 112' is located at the lateral centerline of the header 106. This arrangement—i.e., having a divider 112 at the lateral centerline—is typical for headers 106 having an even number of row units 110. Headers having an odd number of row units typically would have a gap 114 located at the lateral centerline. Although typical, neither configuration is strictly required.

The combine 100 also includes an operator accommodation 120, such as a cabin, cockpit, or the like. Typically, the operator accommodation 120 is an enclosed cabin having a windscreen 122 in the forward direction F. A heads-up display ("HUD") 124 is provided on the chassis 102, and preferably within the operator accommodation 120. The HUD 124 is located along a visual path 126 between a reference point 128 on the combine 100, and a viewing region 130 within the operator accommodation 120. The reference point 128 may be located on the header 106, on the feeder housing 118, on the chassis 102, a virtual point, or elsewhere on the chassis 102. The reference point 128 preferably is at or near the header 106 and/or chassis centerline.

The viewing region 130 is a volume of space in which an operator's head—and more particularly, his or her eyes—can be situated during operation of the combine 100 to view the reference point 128 through the HUD 124. The size of the viewing region 130 may be reduced to some degree by providing adjustable seats to allow operators of various different sizes to place their eyes in the same general space. It is not necessary to identify strict boundaries for the viewing region 130, but a general shape and size of the viewing region 130 can be determined using conventional ergonomic statistical information for human body dimensions, as well known in the art of vehicle design, and it is not necessary to elaborate on such analysis herein. It will also be understood that the viewing region 130 is not necessarily large enough to accommodate any possible operator.

The HUD 124 is operatively connected to or includes an internal processor 132, and is operatively connected to or includes a localization system 134. Together, the HUD 124, processor 132 and localization system 134 form a HUD system. The purpose of the HUD 124 is to project an image that the operator can use to guide the combine 100 to a crop entry point. The crop entry point may be an initial entry point into the field of crops being harvested or otherwise processed, or it may be an entry point into a new set of crop rows upon completing the harvesting or other processing of a previous set of crop rows. The crop entry point preferably is selected such that the header 106 does not miss any crop rows between the processed rows and the standing rows that are processed in the next pass, and such that all of the row units 110 engage the standing crop during the next pass.

Figure 2:
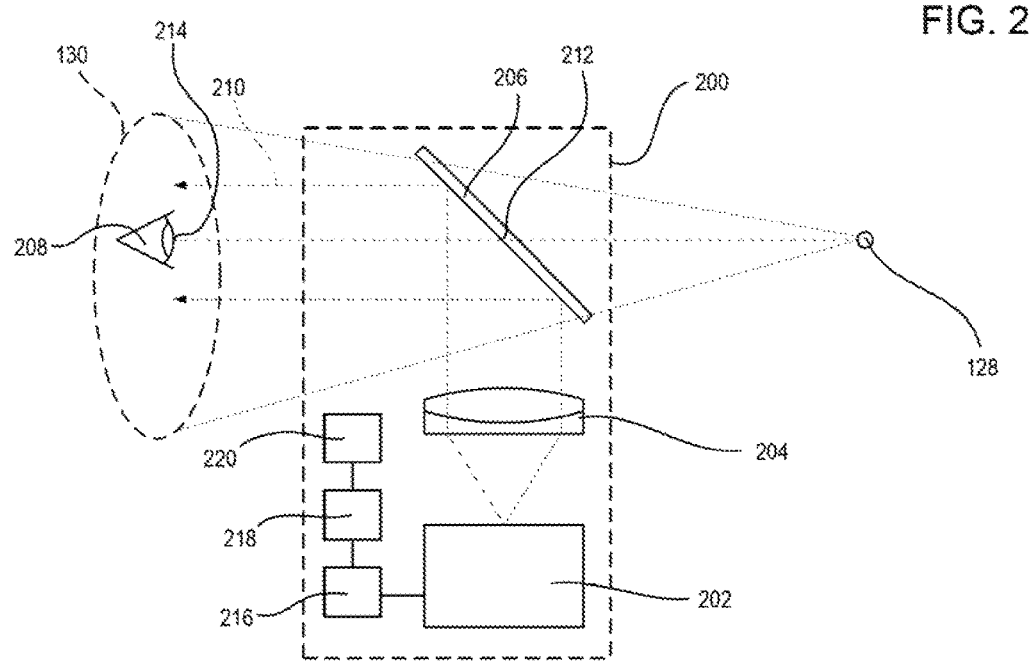
FIG. 2 schematically illustrates an exemplary HUD system and related objects and features.

An example of a HUD system 200 is shown in FIG. 2. The HUD system 200 includes a HUD 124 comprising a projector 202 (e.g., a high-output cathode ray tube or light emitting diode display), collimating optics 204, and a combiner 206. The combiner 206 is a generally transparent (e.g., glass) surface, which may be treated with anti-glare coatings or the like. Images from the projector 202 are reflected by the combiner 206 and directed towards the viewing region 130. The collimating optics 204 make the light rays emanating from the projector 202 parallel (i.e., collimated), which causes the image to be perceived at an infinite focal point. The collimated image also sets a boundary on the viewing angle at which the image can be perceived. Specifically, the image from the projector 202 can only be perceived if the eye 208 is within the boundaries of the collimated image, as shown by the projection lines 210 in FIG. 2. The HUD 124 is aligned with the reference point 128 on the header 106 to a sufficient degree that an image generated by the projector 202 can be overlaid onto the reference point 128 (this is sometimes referred to as "boresighting").

FIG. 2 illustrates various aspects of the optical system that should be understood. First, the viewing region 130 comprises the space in which the reference point 128 is visible through the HUD 124 (specifically, through the HUD's combiner 206). Second, the projected image from the HUD 124 is collimated and only visible within certain boundaries within the viewing region 130. Third, the projector 202 can project an image—specifically an image that is reflected at point 212 on the combiner 206—that is perceived by the eye 208 as being overlaid on the reference point 208. Thus, the HUD 124 can project an image that is perceived at a predetermined location 214 within the viewing region 130 to overlap the reference point 128 on the header 106. The predetermined location 214 will be within the extent of the collimated image, but is not necessarily a finite discrete point. That is, the collimated optical properties of the system allow the operator to move his or her eye 208 to some degree within the viewing region 130 while still perceiving the image as overlapping the reference point 128.

The optics of the HUD 124 may be fixed in place relative to the chassis 102, of they may be movable to accommodate different operators, different reference point locations, and so on. Calibration may be required upon such adjustment. Calibration can be performed by physically boresighting the optics to the reference point 128, or, to some degree, by shifting the image locations emitted from the projector 202.

The particular optical system of the HUD 124 is not critical to the present invention, and it will be understood that the exemplary optics shown in FIG. 2 may be replaced by other systems. For example, the collimating optics 204 may be located between the combiner 206 and the viewing region 130. Also, the combiner 206 may comprise a separate glass, or be integrated into the windscreen 122 (e.g., a particular region of the windscreen 122, or an insert that is attached to or otherwise connected to form part of the windscreen). Other alternatives and variations will be apparent to persons of ordinary skill in the art in view of the present disclosure.

The HUD system 200 also includes an image processing module 216, a path planning module 218 and a position determination module 220.

The position determination module 220 is configured to determine the physical location of the reference point 128. This can be accomplished in various ways. For example, the position determination module 220 may comprise a localization sensor that provides direct input as to the location of the sensor based on environmental signals. One type of localization sensor is a satellite-based radionavigation system (e.g., a Global Positioning System ("GPS") sensor) that detects the location of the sensor (specifically, the sensor's antenna or receiver) on the surface of the earth with accuracy up to about 12 inches. Another type of localization sensor is a cell tower signal sensor that triangulates position based on cell tower transmission. Other types of localization sensor may detect optical images (e.g., barcodes or surrounding geography) to pinpoint the sensor location. The position determination module 220 alternatively (or additionally) may use an active navigation system in which one or more sensors detect properties of the surrounding environment and use those properties to determine the location of the sensor on a predetermined map. One such system may use LIDAR (Light Detection And Ranging), which detects positions of surrounding objects using a moving laser/sensor device. Other systems may use other sensor types. The position determination module 220 also may use an active mapping algorithm, such as a simultaneous localization and mapping ("SLAM") algorithm to map and traverse its environment.

Regardless of how the positional information is determined, it may be necessary to also apply a vehicle model to the data to determine the physical position of the reference point. For example, if a GPS sensor is used to track the position of the combine 100, it may be necessary to modify the position data provided by the GPS sensor to accurately reflect the position of the reference point 128. For example, the position of the reference point 128 may be calculated based on the known physical geometry of the combine 100 and the header 106, the angular position of the feeder housing 118 relative to the chassis 102 (which affects the position of the reference point 128 relative to the chassis 102), and the physical location of the GPS antenna on the chassis 102. However, it is also envisioned that a GPS sensor antenna could be placed at the reference point 128, which could eliminate the need for this position transformation step.

The path planning module 218 receives the position information from the position determination module 220, and determines how the combine 100 must move to reach the next crop entry point. To this end, the path planning module is configured to identify the physical location of the next crop entry point, and calculate a displacement between the current physical position of the reference point and the physical position of the crop entry point. The physical locations of the crop entry points may be predetermined and stored in a map or other database, or determined dynamically.

For example, prior to operating the combine, a travel path of the combine 100 may be plotted on a map of the crop field, and crop entry points may be designated ahead of time on the map. In this case, the path planning module 218 may operate by identifying the current physical position of the reference point on the travel path, and finding the next crop entry point along the travel path. In this case, each crop entry point has a predetermined physical location, and thus the displacement from the reference point 128 to the crop entry point is readily calculated using conventional geometric formulae.

The crop entry points may be dynamically calculated using various methods, such as monitoring the combine's movement and/or actively scanning the crops to identify an entry point. For example, the path planning module 218 may identify the location of the reference point 128 each time the combine exits the crop (via GPS or otherwise), and calculate a new entry point into the crop based on a predetermined size of the header 106. For example, if the header is 30 feet wide, the path planning module 218 may set the crop entry point as a location 30 feet in the lateral direction from the point at which the reference point exited the crop during the previous pass. As another example, the crop entry location may be determined via active sensing, such as by using a camera to evaluate the crop rows, or by passive sensing (e.g., a transmitter located at each crop entry point). Other alternatives and variations will be apparent to persons of ordinary skill in the art in view of the present disclosure.

The path planning module 218 preferably operates essentially continuously (i.e., at periodic iterations of a processing algorithm) during the period of time in which the operator is attempting to guide the combine 100 to the next crop entry point. Thus, it can send a series of signals to the image processing module 216 to cause the image processing module 216 to frequently (e.g., multiple times per second) update the image being generated by the projector 202. This provides a dynamic signal that changes as the combine 100 moves.

The path planning module 218 sends data representing the displacement between the reference point 128 and the crop entry point to the image processing module 216. This data may comprise, for example, heading information to indicate the angular orientation of the crop entry point relative to the reference point 128. The image processing module 216 converts this data into an image that is displayed by the projector 202, and thereby presented to the operator via the combiner 206. The image processing module 216 may use any conventional graphical user interface software and hardware to convert the displacement data into a visible image.

Figure 3:
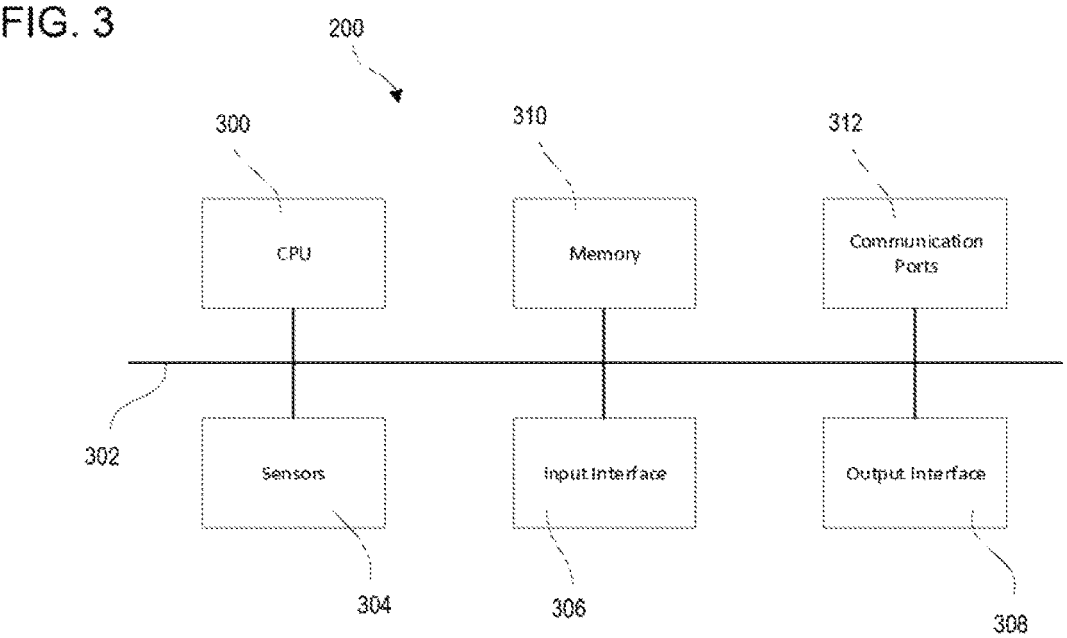
FIG. 3 schematically illustrates an exemplary architecture for a HUD system.

FIG. 3 shows an exemplary architecture for a HUD system 200. In general terms, the HUD system 200 includes one or more computer processors, memories, and related hardware that are programmed to cause the projector 202 to generate the desired images. The components may be collected into a single unit (e.g., a self-contained unit that may be installed on any vehicle), or distributed among different components. Some components, such as memories and processors, also may be multi-functional units. For example, a processor running code to perform combine performance monitoring operations (efficiency, usage statistics, etc.) also may be used to execute code to perform the HUD system operations.

In the shown example, the HUD system 200 includes a central processing unit (CPU) 300, which is responsible for performing calculations and logic operations required to execute one or more computer programs or operations. The CPU 300 is connected via a data transmission bus 302, to sensors 304 (e.g., a localization sensor), an input interface 306, an output interface 308, and a memory 310. The CPU 300 also may be operatively connected to one or more communication ports 312, such as serial communication ports, wireless communication ports, or the like.

The CPU 300, data transmission bus 302 and memory 310 may comprise any suitable computing device, such as an INTEL ATOM E3826 1.46 GHz Dual Core CPU or the like, being coupled to DDR3L 1066/1333 MHz SO-DIMM Socket SDRAM having a 4 GB memory capacity or other memory (e.g., compact disk, digital disk, solid state drive, flash memory, memory card, USB drive, optical disc storage, etc.). The selection of an appropriate processing system and memory is a matter of routine practice and need not be discussed in greater detail herein.

The sensors 304 include any number of feedback or feed-forward sensors configured to indicate the desired data, such as odometers, optical sensors, telemetry sensors, GPS sensors, and so on.

The input interface 306 may include any number or type of device used to input instructions or data to the CPU 300, such as a keyboard, pointer (e.g., mouse or smart pen), joystick, touchscreen, buttons, switches, and so on. The output interface 308 includes the HUD itself, and may comprise any number of other user-perceivable signaling devices, such as a color thin-film transistor (TFT) light emitting diode (LED) backlit display, indicator lights, analog or digital gauges, audio speakers, and so on.

The memory 310 may comprise any type or collection of computer-readable storage media, such as a computer hard drive, an optical medium (e.g., an optical disc), solid-state memory (e.g., flash memory), or other storage media known in the art.

The HUD system 200 includes a program application (e.g., software code) to perform the desired processes. The program application is stored in a tangible computer readable medium in a non-transitory state in the memory 310, and the CPU 300 loads and performs the program application to perform the various processes described herein. The program application may include one or more individual files defining software modules or instructions for performing the functions described herein and various other functions (e.g., engine control and other combine operations), as known in the art. The memory 310 also may store auxiliary data, common files or databases for storing raw and/or processed data, and other auxiliary data.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

The HUD system 200 is configured to project a dynamic guideline 400 that extends from the reference point 128 towards the crop entry point. More specifically, when the operator positions his or her eye 208 at the predetermined location within the viewing region 130 (i.e., so as to view the collimated image projected onto the combiner 206) and looks through the combiner 206, the guideline 400 will appear to begin at the reference point 128. Some offset may be present if calibration or operator head position is not ideal, but minor variations are not expected to affect the performance or effectiveness of the system. The dynamic guideline 400 is dynamic in the sense that it updates as the combine 100 moves.

Figure 4:
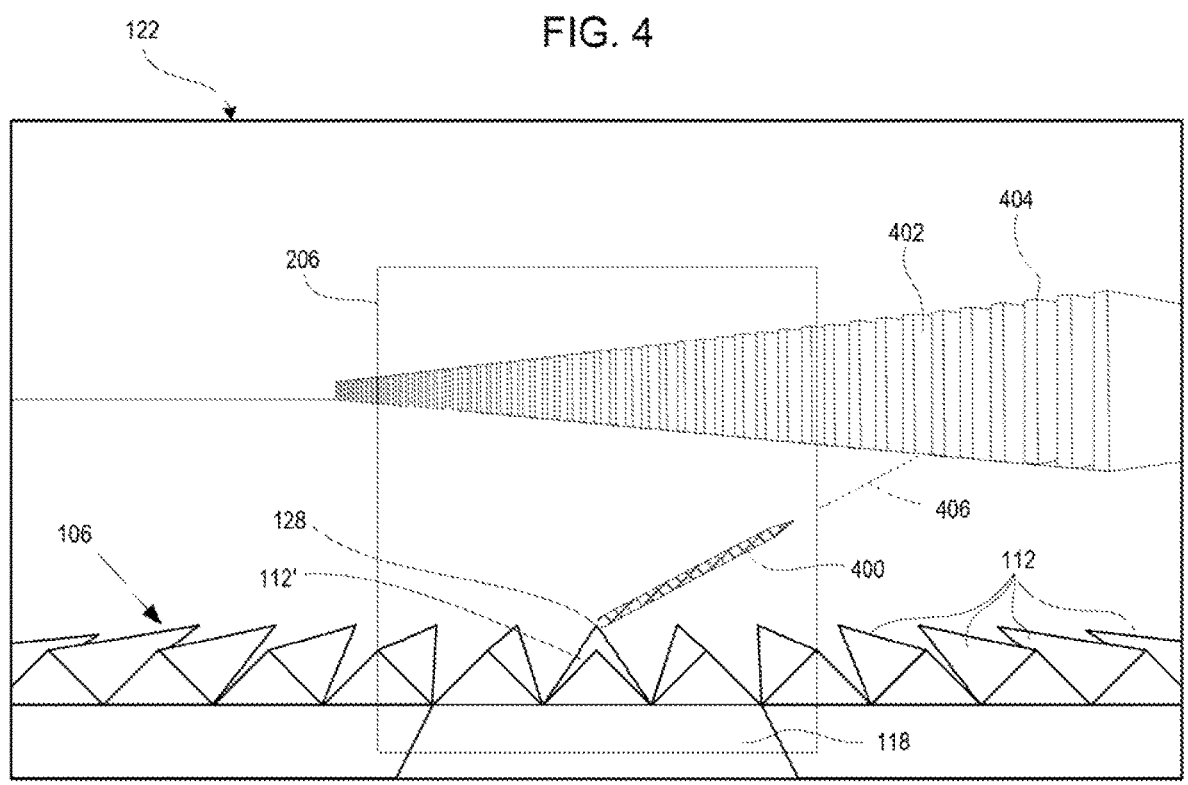
FIG. 4 schematically illustrates a view of a crop field through one exemplary HUD system.

An example of this view is illustrated in FIG. 4, which shows the boundaries of a view through the windscreen 122. Some or all of the dividers 112 are visible to the operator in this view, and a reference point 128, to which the HUD system 200 is calibrated, is located on a divider 112' on the lateral centerline of the header 106. The reference point 128 may be physically marked, such as by painting a mark on the tip of the divider 112', attaching a marker to the divider 112', and so on. The reference point 128 may be located directly on the divider 112', or it may be offset from the divider 112', such as by being mounted on a post or the like. The HUD's combiner 206 is located between the viewing region (which is the view from which FIG. 4 is shown), and the reference point 128.

Through the combiner 206, the operator can see the dynamic guideline 400 beginning at the reference point 128 and extending towards the crop entry point 402. In this case, the header 106 is a twelve-row header, and the crop entry point 402 is a gap between the sixth and seventh unprocessed crop rows 404. The dynamic guideline 400 changes its orientation as the combine 100 moves forward. For example, if the combine 100 moves straight forward or turns left from its existing position, the guideline 400 will pivot clockwise to continue pointing at the crop entry point 402. Similarly, if the combine 100 turns towards the crop entry point 402 the guideline 400 will pivot counterclockwise to continue pointing at the crop entry point 402.

The HUD system 200 may be programmed with information about the combine's physical capabilities, particularly with respect to its turning radius. If the HUD system 200 determines that the combine 100 is incapable of turning at a tight enough radius to enter the reference point 128 at the desired crop entry point 402, an indicator may be provided to the operator in the form of a visual signal (e.g., removing or flashing the dynamic guideline 400 or showing an additional alert signal on the combiner 206). Signals also may be provided when the combine 100 steering system is reaching the limits of its turning radius (e.g., slowly flashing or changing the color of the guideline 400).

In the shown example in FIG. 4, the crop entry point 402 is not within the field of view of the combiner 202. Thus, the guideline 400 does not extend all the way to the crop entry point 402. However, it can be seen from projection line 406 (which is provided for illustration in the figures and not intended to exist in actual implementation) that the guideline 400 is aimed at the crop entry point 402. When the crop entry point 402 comes within the combiner's field of view, the guideline may extend all the way to the crop entry point 402, but this is not strictly required. Also, when the crop entry point 402 is in the combiner's field of view, a marker such as a vertical line, star, bullseye, or the like may be displayed on the crop entry point 402 to highlight it to the operator.

Figure 5:
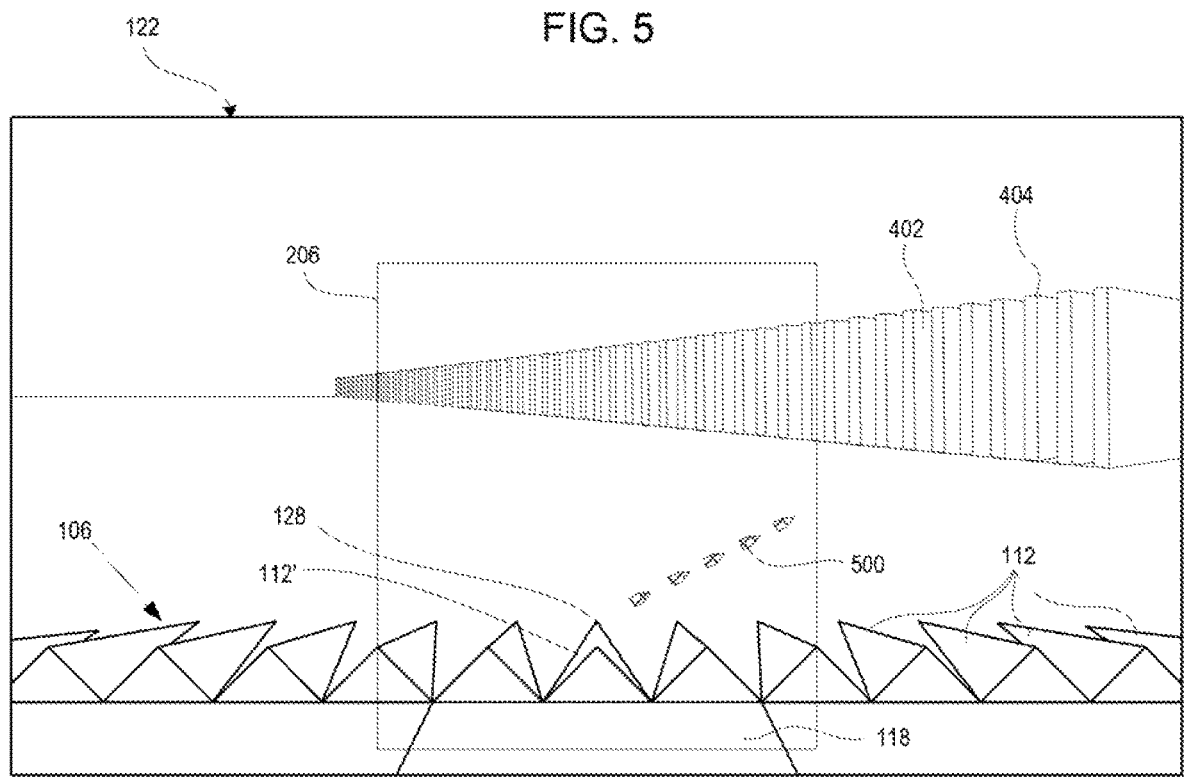
FIG. 5 schematically illustrates a view of a crop field through another exemplary HUD system.

The dynamic guideline 400 may have any suitable color, and it may be animated. For example, the guideline 400 may comprise a series of dashes that emanate from around the reference point 128 and continuously move towards the crop entry point. FIG. 5 shows a dashed guideline 500 that might operate in this way.

Figure 6:
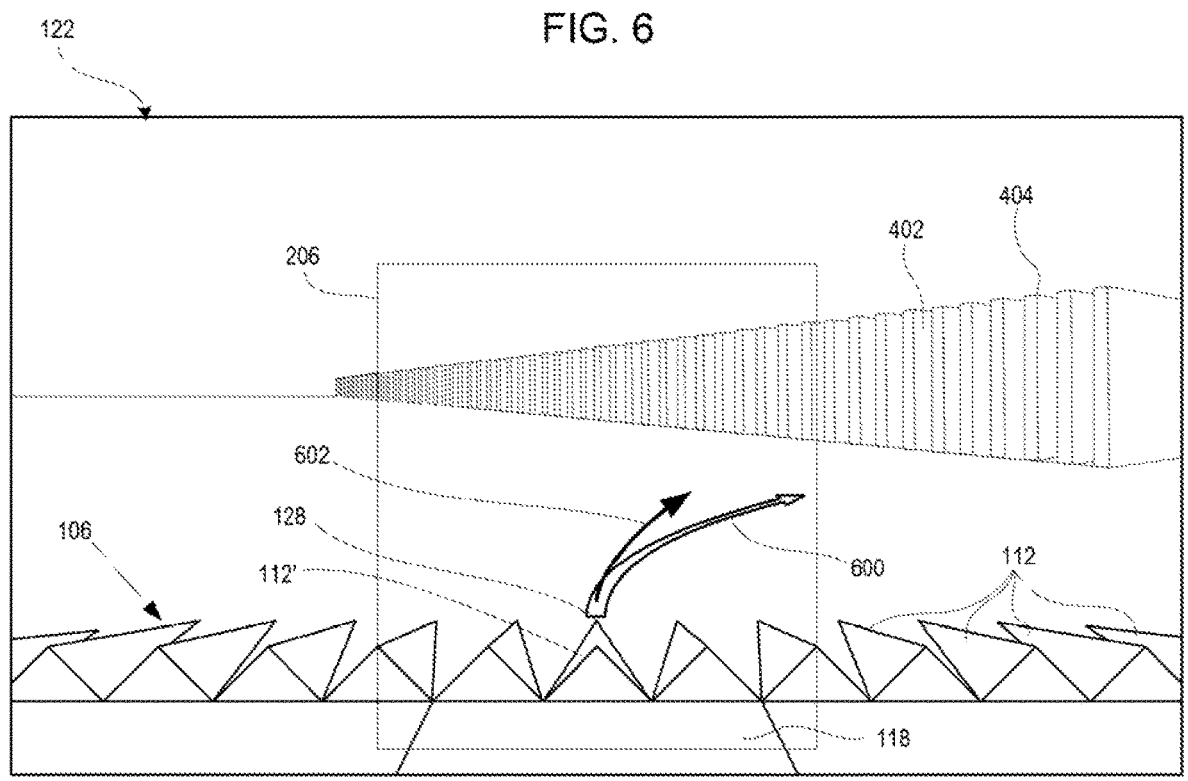
FIG. 6 schematically illustrates a view of a crop field through another exemplary HUD system.

The dynamic guideline may also comprise a curved line, such as the guideline 600 in FIG. 6. The HUD system 200 also may be configured to display the current trajectory of the combine 100, which can be helpful to indicate whether the combine is currently heading towards the crop entry point 402 or how much deviation must be made to the travel path to reach the crop entry point 402. For example, as shown in FIG. 6, a trajectory line 602 may be superimposed on the combiner 206 to show the combine's travel path based on the current steering angle of the drive system. The steering angle may be readily obtained via a sensor on the steering system, by software input if the steering system is a fly-by-wire system, by vehicle telemetry information, or other means, as known in the art. In other cases, steering information can be used to provide a steering requirement indicator, such as a left arrow to indicate that the combine should be turned more to the left, or a right arrow to indicate that the combine should be turned more to the right. Other alternatives and variations will be apparent to persons of ordinary skill in the art in view of the present disclosure.

Figure 7:
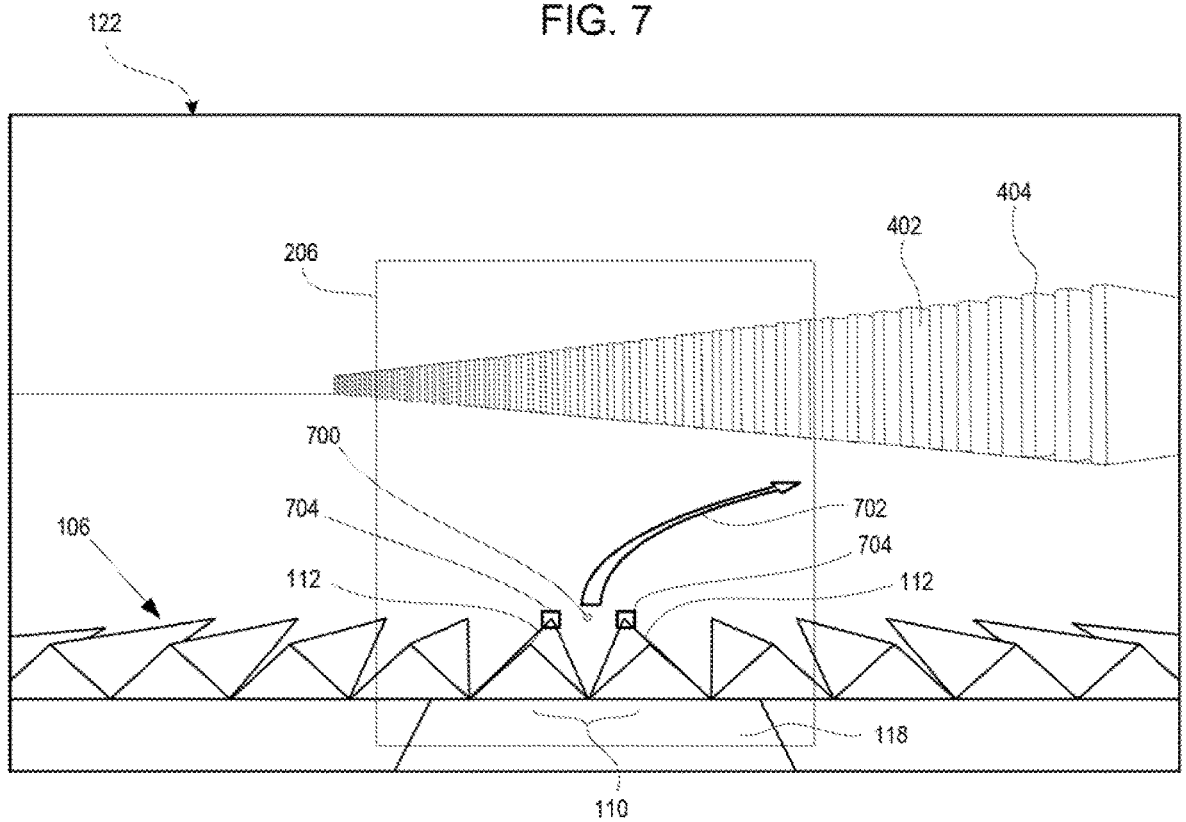
FIG. 7 schematically illustrates a view of a crop field through another exemplary HUD system.

FIG. 7 shows another embodiment in which the reference point is a virtual reference point 700 located offset from the header 106. In this case, the virtual reference point 700 comprises a location between two dividers 112. The virtual reference point 700 may be identified with a graphical image on the HUD combiner 206, but this is not required. A virtual reference point 700 may be useful when the header has an odd number of row units 110, or when visibility of the reference point is likely to be obstructed during use.

When a virtual reference point 700 is used, the guideline 702 extends from a space adjacent to one of the row units 110. In this case, the HUD system 200 may display a reference mark or marks to help the operator align the HUD image with the surroundings. For example, reference marks 704 may be displayed to correspond to the tips of the two dividers 112 spanning the central row unit 110. In this way, the operator can position his or her head to assure that the divider tips are located under the reference marks 704 to be sure that the guideline 702 is accurately portraying the direction to the crop entry point 402. Operation with a virtual reference point 700 is otherwise the same as operation with a real reference point on a physical part of the header 106.

Figure 8:
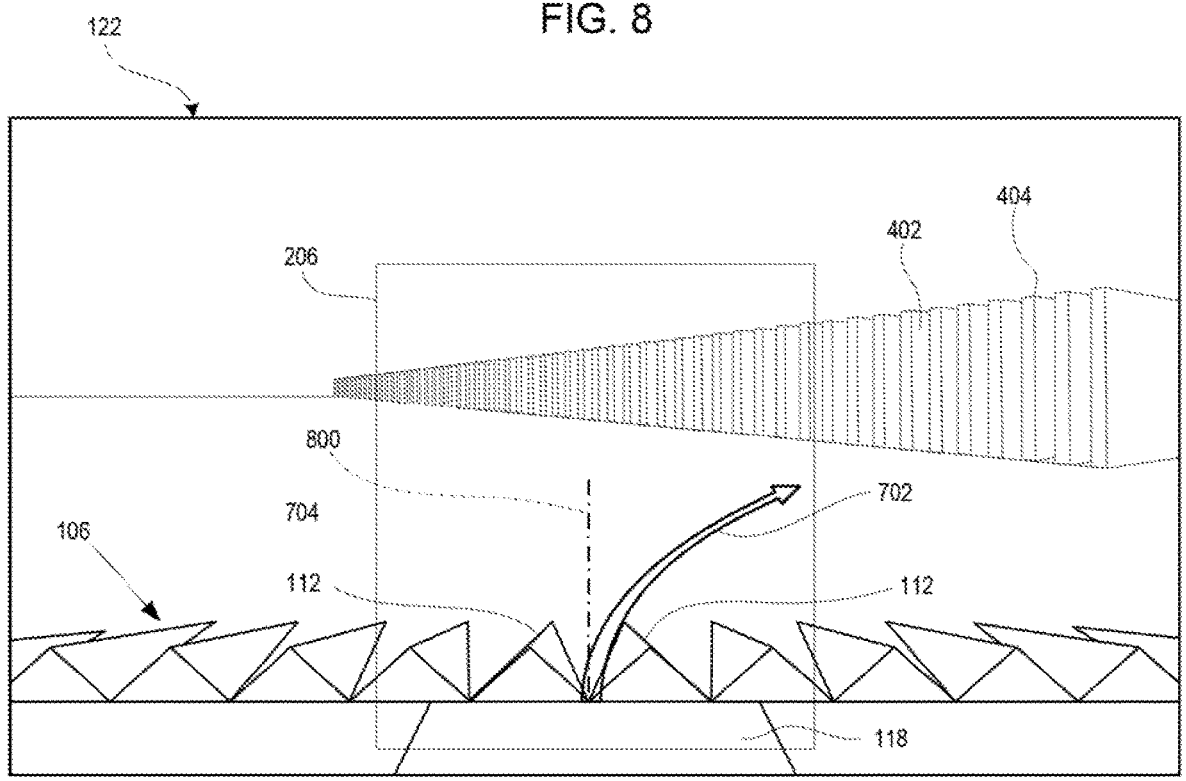
FIG. 8 schematically illustrates a view of a crop field through another exemplary HUD system.

FIG. 8 shows another embodiment in which the reference point is a point on a centerline 800 of the combine 100. The centerline 800 may be identified with a graphical image on the HUD combiner 206, but this is not required. In this case, the guideline 702 extends from the centerline 800 towards the crop entry point 402. The reference point and the origin of the guideline 702, may be located at any point along the centerline 800, such as on the header 106, feeder housing 118 or chassis 102, or a virtual location such as discussed above. The guideline 702 preferably begins at a location that is positioned below the crop entry point 402 as viewed through the combiner 206, which is expected to make the guideline 702 more intuitive to use to guide the combine 100.

It is expected that a dynamic guideline such as those described herein or of similar design will be particularly effective at helping a machine operator to guide the machine to a proper position relative to crops. For example, the dynamic guideline provides an intuitive display of how the machine must be operated to direct it to the crop entry point, and maintains the operator's focus on the header itself. The dynamic movement of the guideline in the view of the operator is also expected to be easier and more intuitive to follow than systems that merely direct the operator to turn left or turn right to maintain a desired course. This type of display is also expected to be more helpful to allow the operator to plan additional maneuvers (e.g. extra movements to avoid an obstacle adjacent the crops) during the process of turning back towards the crops because it provides a better indication of not only how much the operator has to turn the combine, but where the final destination for the entry point ultimately is. Furthermore, while it will be understood that embodiments may be particularly useful for crops that are processed using headers or other devices with row units, embodiments also may be used with machines that do not have row units to ensure accurate placement of the header or other processing equipment.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An agricultural vehicle comprising:
a chassis supported for movement on the ground by wheels;
a header operatively connected to a front end of the chassis;
an operator accommodation located on the chassis and having an associated viewing region; and
a heads-up display system located on the chassis on a visual path between a reference point on the combine and the viewing region, wherein the heads-up display system is configured to project an image visible from a predetermined location within the viewing region, the image comprising a dynamic guideline extending from the reference point towards a crop entry point.

2. The agricultural vehicle of claim 1, wherein the header comprises a plurality of row units, and the reference point comprises a point associated with one or more of the row units.

3. The agricultural vehicle of claim 2, wherein the header comprises a divider between two adjacent ones of the plurality of row units, and the reference point comprises a point on the divider.

4. The agricultural vehicle of claim 2, wherein the reference point comprises a virtual point located in a space adjacent the one or more of the row units.

5. The agricultural vehicle of claim 1, wherein the reference point comprises a point on a lateral centerline of the header.

6. The agricultural vehicle of claim 1, wherein the heads-up display is adjustable to move the predetermined point within the viewing region.

7. The agricultural vehicle of claim 1, wherein the dynamic guideline comprises a straight line extending from the reference point towards the crop entry point.

8. The agricultural vehicle of claim 1, wherein the dynamic guideline comprises a curved line extending from the reference point towards the crop entry point.

9. The agricultural vehicle of claim 8, wherein the curved line comprises a projection of a curved travel path from the reference point to the crop entry point.

10. The agricultural vehicle of claim 1, wherein the image further comprises a dynamic representation of an instantaneous travel path of the agricultural vehicle.

11. The agricultural vehicle of claim 1, wherein the dynamic guideline comprises a dashed line.

12. The agricultural vehicle of claim 1, wherein the dynamic guideline comprises an animated line.

13. The agricultural vehicle of claim 1, wherein the heads-up display system is configured to:
determine a physical location of the reference point;
determine a physical location of the crop entry point; and
determine a displacement between the physical location of the reference point and the physical location of the crop entry point.

14. The agricultural vehicle of claim 11, wherein the heads-up display system is configured to determine the physical location of the reference point by:
obtaining a position of a localization sensor from a location sensor; and
applying a predetermined offset to the position of the localization sensor to calculate the physical location of the reference point.

15. The agricultural vehicle of claim 14, wherein the localization sensor comprises a global positioning system sensor.

16. The agricultural vehicle of claim 13, wherein the heads-up display system is configured to determine the physical location of the crop entry point by correlating an identity of the crop entry point with predetermined map coordinates for the crop entry point.

17. The agricultural vehicle of claim 13, wherein the heads-up display system is configured to determine the physical location of the crop entry point based on vehicle position information.

18. The agricultural vehicle of claim 17, wherein the heads-up display system is configured to determine a physical location of the crop entry point based on a physical position of the reference point at a time when the reference point exits a processed row of crops.

19. The agricultural vehicle of claim 1, wherein the heads-up display comprises a projector and a combiner, and the combiner is integral with a windscreen covering a portion of the operator accommodation.

20. The agricultural vehicle of claim 1, wherein the agricultural vehicle comprises a combine having a threshing and separating system, and the header is connected to the threshing and separating system by a feeder housing.

* * * * *